United States Patent
Aihara et al.

[11] Patent Number: 5,259,097
[45] Date of Patent: Nov. 9, 1993

[54] STRETCHING MACHINE

[75] Inventors: Kintaro Aihara, Chiba; Tadashi Honda, Tokyo; Masashi Kobayashi, Kisarazu; Hideyo Rohyama, Yokohama; Kazuhiko Kurihara, Tokyo; Hiroshi Yazawa, Kunitachi; Toshikazu Ohishi, Kawaguchi, all of Japan

[73] Assignees: Nippon Petrochemicals Co., Ltd.; Polymer Processing Research Institute, Ltd., both of Tokyo, Japan

[21] Appl. No.: 749,555

[22] Filed: Aug. 23, 1991

[30] Foreign Application Priority Data

| Aug. 23, 1990 | [JP] | Japan | 2-222095 |
| Sep. 13, 1990 | [JP] | Japan | 2-243146 |
| Sep. 26, 1990 | [JP] | Japan | 2-256288 |

[51] Int. Cl.$^5$ .............................................. D06C 3/02
[52] U.S. Cl. .......................................... 26/92; 26/90; 26/106
[58] Field of Search ................ 26/92, 106, 81, 91, 26/90, 71, 87, 88, 51; 34/155, 156, 152

[56] References Cited

U.S. PATENT DOCUMENTS

| 49,947 | 9/1865 | Bennett | 26/90 |
| 416,343 | 12/1889 | Palmer | 26/90 |
| 430,749 | 6/1890 | Palmer | 26/90 |
| 436,178 | 9/1890 | Lane, Jr. | 26/106 |
| 1,238,742 | 9/1917 | Butler | 26/90 |
| 1,753,025 | 4/1930 | Roosevelt | 26/90 |
| 2,595,233 | 5/1952 | Dungler | 26/92 |
| 3,050,816 | 8/1962 | McCreary | 26/92 |
| 3,171,873 | 3/1965 | Fikentscher et al. | 26/90 |
| 3,258,866 | 7/1966 | Bates | 26/92 |
| 3,722,105 | 3/1973 | Marteny | 34/156 |
| 3,762,003 | 10/1973 | Frezza | 26/81 |
| 3,902,230 | 9/1975 | Schwarz | 26/81 |
| 4,103,403 | 8/1978 | Parrillo et al. | 26/91 |
| 4,227,317 | 10/1980 | Fleissner | 34/155 |
| 4,774,770 | 10/1988 | Langer et al. | 26/92 |
| 4,815,181 | 3/1989 | Dornier et al. | 26/92 |
| 4,862,564 | 9/1989 | Kuack | 26/92 |
| 4,899,427 | 2/1990 | Gresens | 26/92 |

FOREIGN PATENT DOCUMENTS

| 571136 | 3/1959 | Belgium. | |
| 0099184 | 1/1984 | European Pat. Off.. | |
| 91011 | 6/1896 | Fed. Rep. of Germany | 26/90 |
| 2024315 | 12/1971 | Fed. Rep. of Germany | 34/155 |
| 213002 | 8/1984 | Fed. Rep. of Germany | 26/92 |
| 3621105 | 7/1988 | Fed. Rep. of Germany. | |
| 1342636 | 9/1963 | France. | |
| 1528036 | 4/1968 | France | 26/90 |
| 57-30056 | 4/1982 | Japan. | |
| 849436 | 9/1960 | United Kingdom | 2/2 |
| 2175246 | 11/1986 | United Kingdom. | |

Primary Examiner—Clifford D. Crowder
Assistant Examiner—Amy B. Vanatta
Attorney, Agent, or Firm—Zarley, McKee, Thomte, Voorhees, & Sease

[57] ABSTRACT

A pair of stretching pulleys are rotatably mounted on a pair of support plates within a housing. A belt is wound around the upper part of the stretching pulley and a number of turn pulleys. A film introduced onto the stretching pulley is held between the belt and the stretching pulley and is transferred. Air flow generated by a fan and heated with a heater is blown against the film through a louver and circulates through bellows mounted to the housing to return to the fan. The stretching pulley is partially cooled in a water bath. The support plates are rotatably connected to screw shafts, thereby changing a distance and angle between the plates. The stretch width or stretch ratio of the film is thus adjusted with the change of the distance and angle.

33 Claims, 11 Drawing Sheets

STRETCHING MACHINE

BACKGROUND OF THE INVENTION

The present invention relates to a stretching machine for stretching a stretchable long sheet-like member such as a polyethylene film (including a slitted film), a net, woven fabric and non-woven fabric, in the direction of width.

There is a known stretching machine in Japanese Patent Publication No. 57-30056, in which there are a pair of support plates, an inlet side for a long sheet-like member, and an outlet side, with the space between the plates increasing from the inlet to the outlet side. A stretching pulley and a circulating belt are mounted on the support plate so as to stretch the sheet-like member in the direction of width by holding the sheet-like member between the pulley and the belt. To heat the sheet-like member to a temperature suitable for stretching, a spaced apart infrared heater or hot air is used.

One end of the support plate is connected to a spline shaft at the inlet side for, and the other end at the outlet side being connected to the spline shaft, the one being movable in a lateral direction.

In the stretching machine, there is a disadvantage of a large heat loss because radiation heat or hot air goes away after the stretchable sheet-like member which is heated to a certain temperature owing to non-collection thereof. In addition, when the infrared heater is used, there is a disadvantage that discontinuation of the sheet-like member would melt the member itself so as to damage the quality of products owing to difficulty in temperature control of radiation heat. In the above stretching machine, both the support plates, accessibly connected with spline shafts, make the spreading size of the sheet-like member adjustable, but the stationary remote infrared heater and nozzle make it impossible to heat all the stretched portions of the sheet-like member to a uniform temperature.

In the above stretching machine, when the sheet-like member is heated with radiation heat or hot air during stretching of the sheet-like member, the stretching pulleys and a circulating belt are heated at the same time. The sheet-like member is heated once, but the stretching pulleys and belt are continuously heated to a temperature the same as that of the sheet-like member or above. Thus, the sheet-like member held between the pulley and the belt becomes crinkled, and at worst, the crinkled portion is melted to stick to the stretching pulley and belt so as to be damaged, and is wound to pulleys with which the belt is engaged. There is a disadvantage that the life of the belt itself is remarkably shortened owing to heat damage.

In the stretching machine described above, it lacks clarity how to adjust and determine an angle between the support plates; thus, it is necessary to improve a method of adjusting stretch width or stretch ratio of a stretchable sheet-like member or a film.

SUMMARY OF THE INVENTION

It is an object of the invention to provide a hot-air circulating stretching machine in which circulating hot air is blown against a stretchable long sheet-like member, thereby increasing thermal efficiency to heat all the sheet-like member to uniform temperature to obtain a product stable in quality.

It is a further object of the invention to provide a stretching machine which is able to prevent a stretchable long sheet-like member from forming creases or cracks and from heat degradation in transfer devices.

It is a still further object of the invention to provide a stretching machine which can make it easier to adjust stretch width or stretch ratio of a stretchable long sheet-like member.

According to one aspect of the present invention, there is provided a stretching machine comprising a housing; a pair of frames which face each other within the housing; a pair of stretching pulleys each mounted to the frame; a belt which is wound around said stretching pulleys, a stretchable long sheet-like member being held between said stretching pulley and the belt which is wound around the pulley; hot-air generating means for generating air flow, heating it to hot air and blowing hot air against the sheet-like member; and hot-air circulating passages for circulating hot air which is blown against the sheet-like member.

According to the present invention, hot air is blown against the sheet-like member or film and circulates, thereby applying hot air again after heating to the sheet-like member and increasing thermal efficiency. In addition, the sheet-like member is equally heated to uniform temperature to obtain a product having stable quality.

According to a further aspect of the present invention, there is provided a stretching machine comprising transfer means for transferring a long sheet-like member which is held thereby, and spreading it in the direction of width of the sheet-like member; heating means for heating the sheet-like member during transfer on the transfer means; and cooling means for cooling the transfer means.

The present invention prevents the sheet-like member from forming creases and cracks and protects the member from heat degradation.

According to a still further aspect of the invention, there is provided a stretching machine comprising a housing; a pair of holding transfer means for holding and transferring a stretchable long sheet-like member to spread it in the direction of width of the sheet-like member; inlet-side distance changing means for moving at least one of the holding transfer means at an inlet side for the sheet-like member in the direction of width of the sheet-like member, thereby changing the distance between said pair of holding transfer means at the inlet side; and outlet-side distance changing means for moving at least one of the holding transfer means at an outlet side for the sheet-like member in the direction of width of the sheet-like member, thereby changing the distance between said pair of holding transfer means at the outlet side.

The distance between the support plates at the inlet or outlet side is independently variable, thereby changing stretch width or stretch ratio of the sheet-like member or film without interrupting the operation of the machine.

BRIEF DESCRIPTION OF THE DRAWINGS

The invention will now be described by way of embodiments with reference to the accompanying drawings in which.

DETAILED DESCRIPTION OF THE EMBODIMENTS

Figure 1:
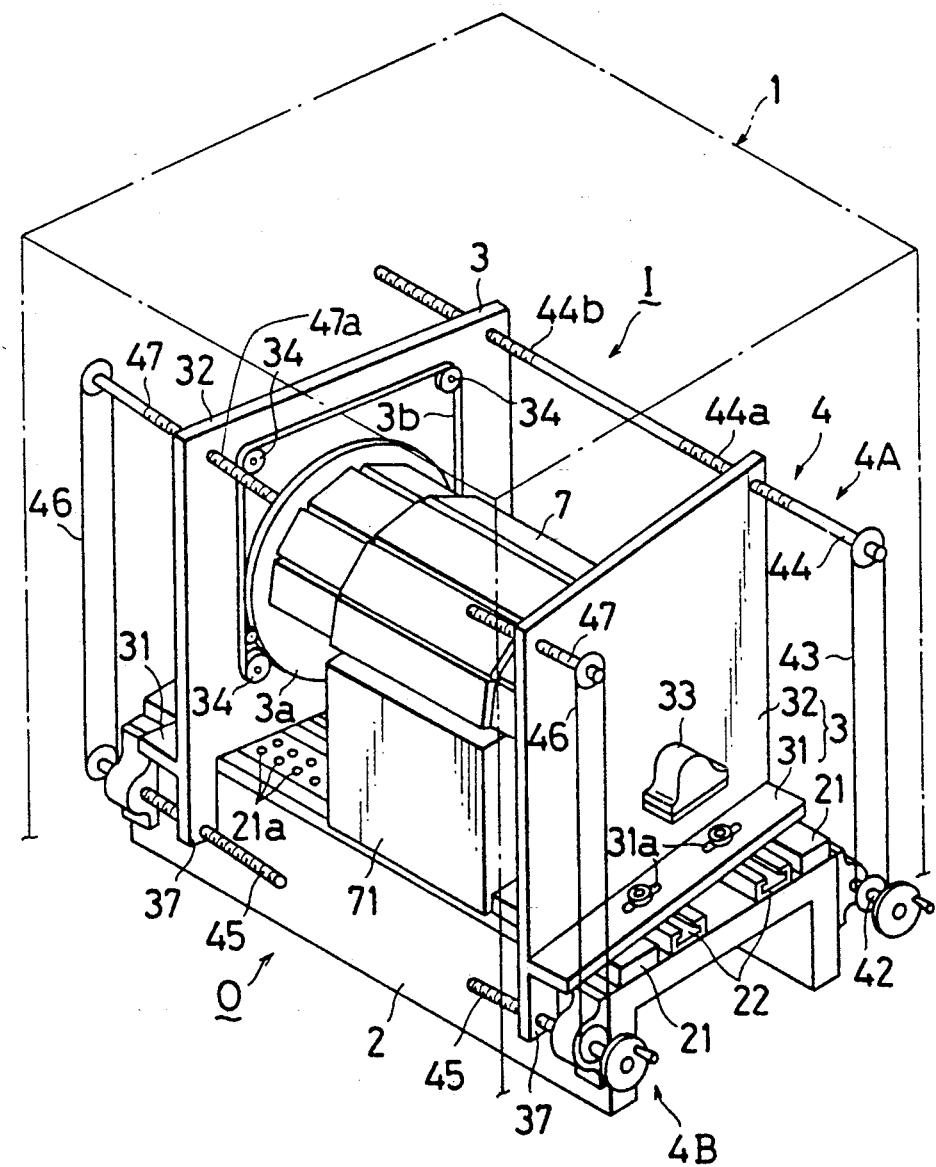
FIG. 1 is a perspective view of a stretching machine according to the present invention.

In the drawings, the numeral 1 denotes a housing in a hot-air circulating stretching machine; 2 denotes a base fixed to the bottom of the housing 1; the numerals 3 and 3 denote a pair of support plates between which a distance is smaller at an inlet side "I" of a stretchable long sheet-like member or a film "F" and is larger at an outlet side "O"; 4 denotes stretch-width/stretch-ratio adjusting mechanism for allowing the support plates 3 and 3 to move towards and away from each other; 4c denotes a water bath as cooling means for cooling a stretching pulley mentioned below; 5 denotes a hot-air generating device above the support plates 3 and 3 within the housing 1; 6 and 6 denote hot-air circulating passage at the inlet side "I" and the outlet side "O" for the film "F" within the housing 1; and 7 denotes a hot-air guide member between stretching pulleys 3a and 3a on the support plates 3 and 3.

Figure 5:
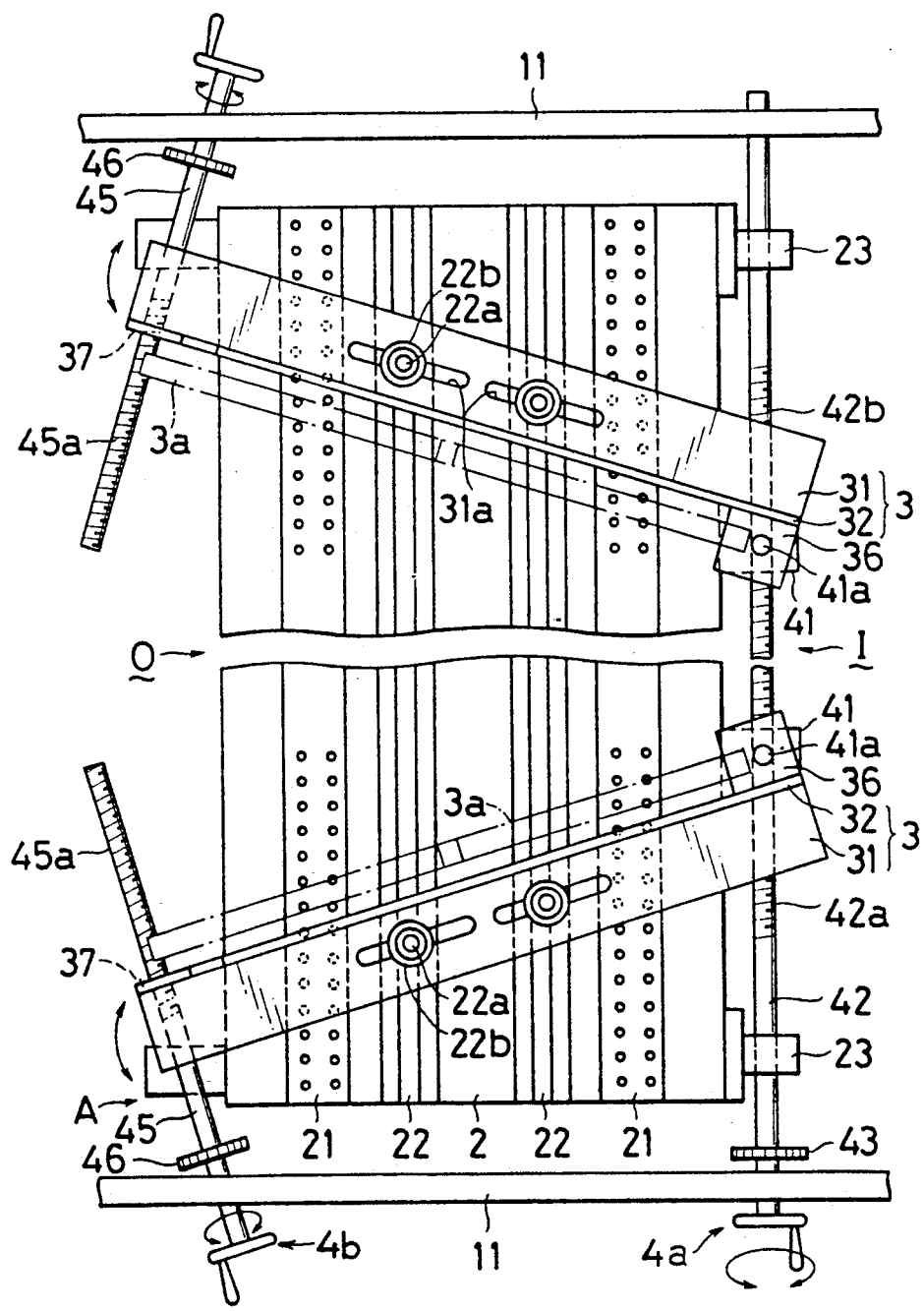
FIG. 5 is a plan view which illustrates the support plates and a stretch-width/stretch-ratio adjusting mechanism.
Figure 6:
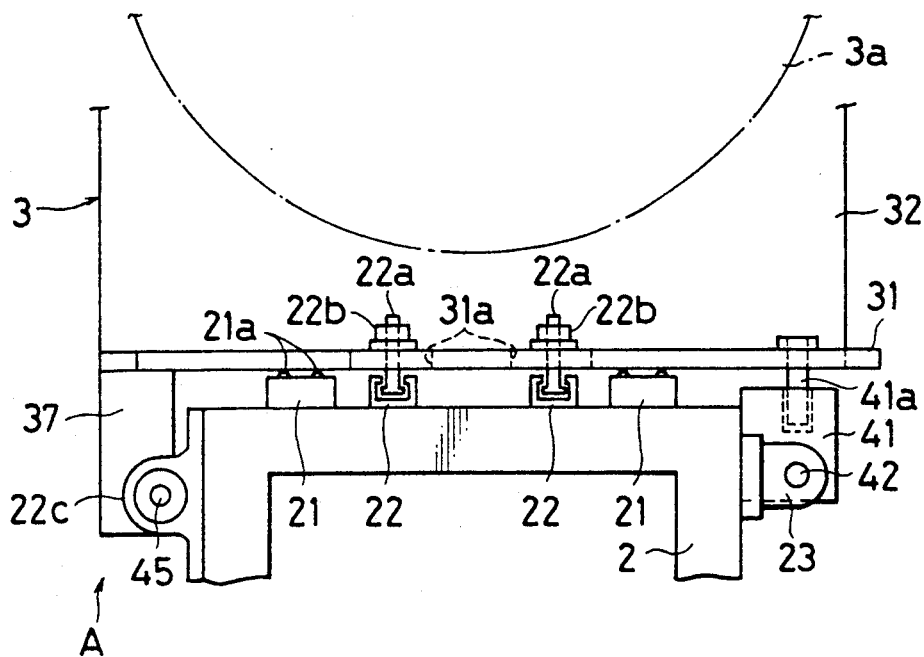
FIG. 6 is a front view which illustrates the support plate and the stretch-width/stretch-ratio adjusting means.

As shown in FIG. 1, the support plates 3 and 3 comprise horizontal base plates 31 and 31 and side plates 32 and 32 extending towards the hot-air generating device 7 to form "L"-like shapes. In FIGS. 5 and 6, the horizontal base plates 31 and 31 of the support plates 3 and 3 are located on a pair of track rails 21 and 21 and a pair of fixed rails 22 and 22 on the base 2. A plurality of steel balls 21a are embedded on the surface of the track rails 21 so that the support plates 3 and 3 may move in the direction of width of the film "F". A pair of fixed screws 22a and 22 which are slidably engaged with the fixed rail 22, are engaged with elongated openings 31a and 31a on the horizonal base plates 31 and 31 and nuts 22b and 22b are engaged with the fixed screws, so that the support plates 3 and 3 are fixed on the base 2.

As shown in 1 to 3, the film "F" is held and spread on the inner walls of the side plates 32 and 32 of he support plates 3 and 3, thereby adjusting the holding force of the film against the stretching pulleys 3a and 3a.

Figure 2:
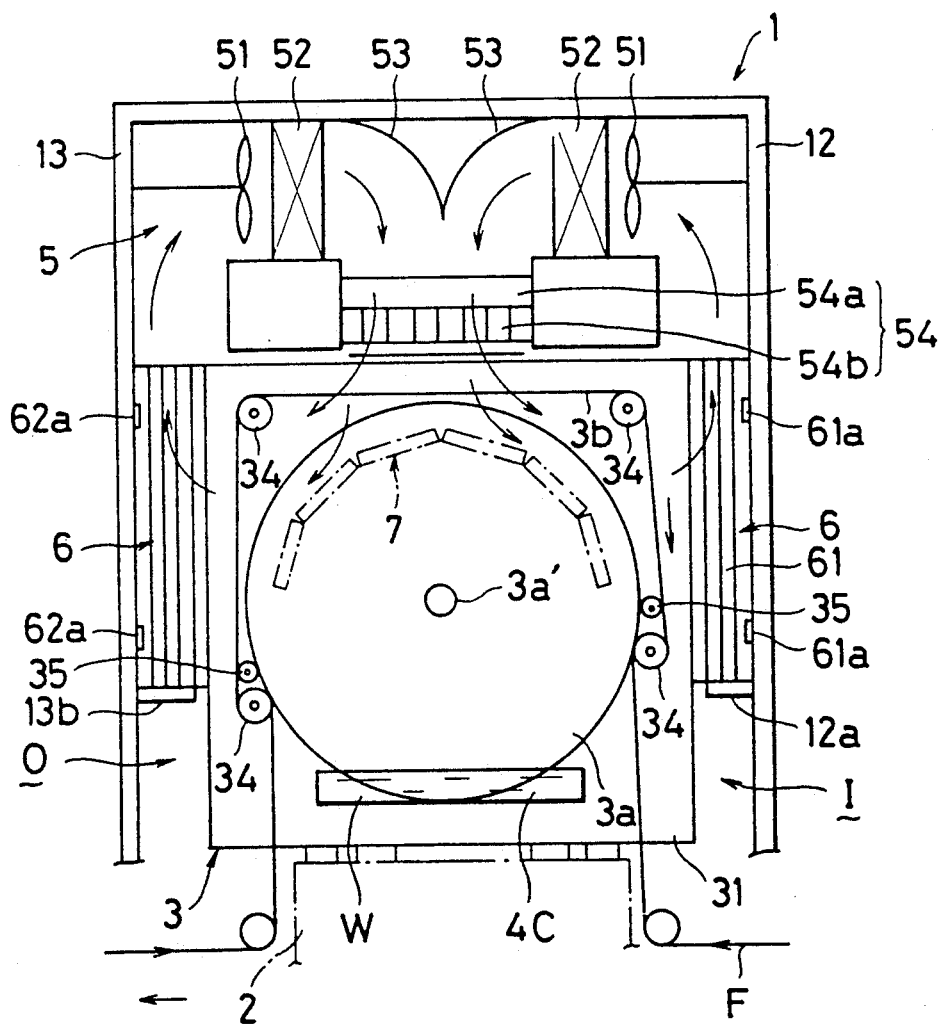
FIG. 2 is a sectional side view which illustrates a support plate, hot air circulating passages and hot air guide plates in the stretching machine.

The stretching pulleys 3a and 3a are rotated in a direction from the inlet side "I" to the outlet side "O" for the film by a motor 33 connected to the outer wall of the side plate 32. The circulating belts 3b and 3b are stretched over the upper semicircular parts of the stretching pulleys 3a and 3a via a plurality of turn pulleys 34 mounted on the side plates 32 and 32. The belt 3b circulates on and over the upper semicircular portion of the stretching pulley 3a with rotation of the pulley. As shown in FIG. 2, there are provided a pair of tension pulleys 35 and 35 which are movably connected to the side plate 32 at the inlet and outlet sides "I" and "O" for the film "F". By moving the tension pulleys 35 and 35, the holding force of the film "F" between the pulley 3a and the belt 3b can be adjusted.

Shafts 3a' and 3a' of the stretching pulleys 3a and 3a are connected to a pair of speed-variable motors 33 and 33 provided on the side plates 32 and 32. The motors 33 and 33 drive the film "F" to rotate in a direction from the inlet side "I" to the outlet side "O". The motors 33 and 33 include a transmission and vary the rotation al speed of the stretching pulleys 3a and 3a at multi-stages or infinitely. The transmission, instead of a mechanical system, may be an electric system such as a d.c. motor, an inverter motor and an electromagnetic clutch.

The motors 33 and 33 are mounted to the support plates 3 and 3 and thus moved with the stretching pulleys 3a and 3a by movement of the support plates 3 and 3, thereby simplifying the drive transmission mechanism which comprises the drive motors 33 and 33 and the stretching pulleys 3a and 3a, and increasing a moving range of the stretching pulleys 3a and 3a. The stretching pulleys 3a and 3a are driven by the motors 33 and 33 respectively, thereby facilitating drive control of the stretching pulleys 3a and 3a compared with one-motor driving. That is to say, in case that the film "F" goes obliquely owing to any accident during operation or on starting, the inclination of the film "F" is corrected to straight movement by the following way:

(a) control the speed of the motor 33 at the advanced position of the film "F" to a lower speed to make a temporary reduced rotation of one of the stretching pulleys 3a connected to the motor, thereby putting the advanced end at the same speed as the delayed end; or (b) change the speed of the motor 33 at the delayed position of the film "F" to a higher speed, thereby making a temporary increased rotation of the other stretching pulley 3a connected to the motor to put the delayed end at the same speed as the advanced end.

The cooling means comprise a water bath 4c, which is fixed on the lower inner wall of the side plate 32 and receives a lower position of the stretching pulley 3a. The water bath 4c cools a non-holding portion of the stretching pulley 3a with water "W" stored therein.

Figure 7:
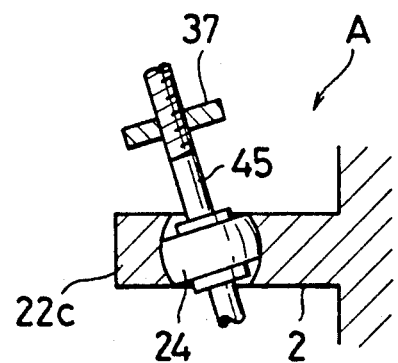
FIG. 7 is an enlarged sectional view of the portion "A" in FIG. 6.

As shown in FIGS. 5, 6 and 7, the stretch-width/stretch-ratio adjusting mechanism 4 comprises an inlet-side distance changing mechanism 4A for moving the support plates 3 and 3 in the direction of width of the film "F" to change the distance between the stretching pulleys 3a and 3a at the inlet side for the film "F"; and an outlet-side distance changing mechanism 4B for moving the support plates 3 and 3 in the direction of width of the film "F" to change the distance between the stretching pulleys 3a and 3a at the outlet side for the film "F".

The inlet-side distance changing mechanism 4A comprises a pair of holders 41 and 41 rotatably mounted to projections 36 and 36 around shafts 41a and 41a, the projections 36 and 36 projecting from the support plates 3 and 3 opposite the horizontal base plates 31 and 31 at the inlet side for the film "F"; a first screw shaft 42 for adjusting stretch width supported in bearings 23 and 23 of the base 2 at the ends at the inlet for the film "F", reverse threads 42a and 42b in the middle being engaged with the holders 41 and 41; a second screw shaft 44 for assisting adjustment of stretch width connected to the first screw shaft 42 via a chain 43, the ends of the shaft 44 being supported in the upper side walls 11 and 11 of the housing 1, reverse threads 44a and 44b in the middle being engaged with spherical bearings (not shown) on the side plates 32 and 32 of the support plates 3 and 3.

The outlet-side distance changing mechanism 4B comprises a pair of third screw shafts 45 and 45 for adjusting stretch ratio at the outlet side for the film "F", one end of the shaft 45 being shakably supported on automatically adjusting spherical bearings 22c and 22c of the base 2 (FIG. 7), the other thread ends 45a and 45a being engaged with the projections 37 and 37 of the support plates 3 and 3; and a pair of fourth screw shafts 47 and 47 for assisting adjustment of stretch ratio connected to the third screw shafts 45 and 45 via chains 46 and 46 respectively, the ends of the shafts 45 and 45 being held in the upper side walls 11 and 11 of the housing 1 with the automatically adjusting bearings (not shown), the other thread ends 47a and 47a being engaged with the side plates 32 and 32 of the support plates 3 and 3.

In the stretching machine in which the support plates 3 and 3 are connected by the stretch-width/stretch-ratio adjusting mechanism 4 as above, as shown in FIG. 5, when a handle of the first screw shaft 42 is rotated in a left direction, the holders 41 and 41 move towards each other along the base 2, and on the contrary, when the handle of the first screw shaft 42 is rotated in a right direction, the holders 41 and 41 move away from each other, thereby adjusting the distance between the support plates 3 and 3 to vary the stretch ratio of the film "F" during operation of the stretching machine.

In order to adjust the stretch ratio of the film "F", the handles for the third screw shafts 45 and 45 are rotated in an opposite direction, so that the support plates 3 and 3 are rotated around the holders 41 and 41 in the same direction to change an angle between the support plates 3 and 3.

Figure 4:
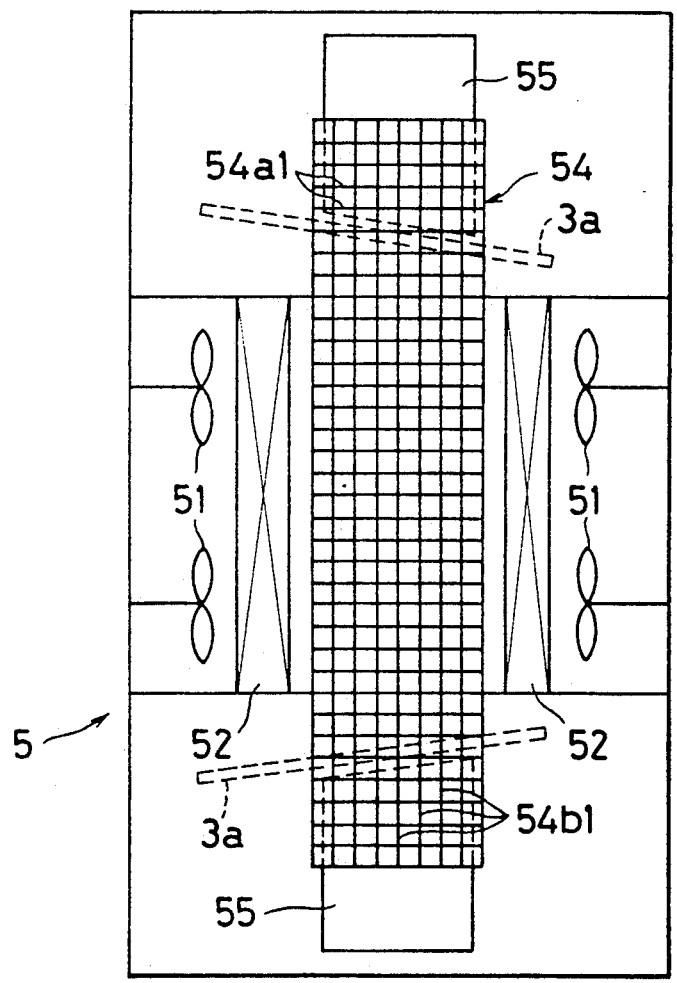
FIG. 4 is a plan view of a hot-air generating device.

As shown in FIGS. 2 and 4, the hot-air generating device 5 comprises fans 51, heaters 52, a flow-regulator 53 and a louver 54. The two or more fans 51 and the heaters 54 are provided to face each other between the side plates 32 and 32 of the support plates 3 and 3. Air flow generated by the fans 51 is heated by the heaters to a temperature suitable for spreading the film "F" to create hot air, which is blown against the flow regulator 53 by the rear fans 51 and 51. The V-shaped flow regulator 53 is located between the heaters 52 and 52 to guide hot air from the heater to the louver 54, which comprises an upper longitudinal louver 54a and a lower lateral louver 54b between the flow-regulating plate 53 and the support plates 3. The angles of wind-direction regulating plates 54a1, 54a1 . . . 54b1, 54b1 in each louver 54a and 54b are adjusted, thereby regulating distribution of hot air which is blown against the middle of the stretching path of the film "F". As shown in FIG. 4, a pair of shutter plates 55 and 55 are slidably mounted at both ends of the lateral louvers 54b in the louver 54. The shutter plates 55 and 55 prevent hot air from leakage to the outside by sliding, depending on the position of the support plate 3.

Figure 3:
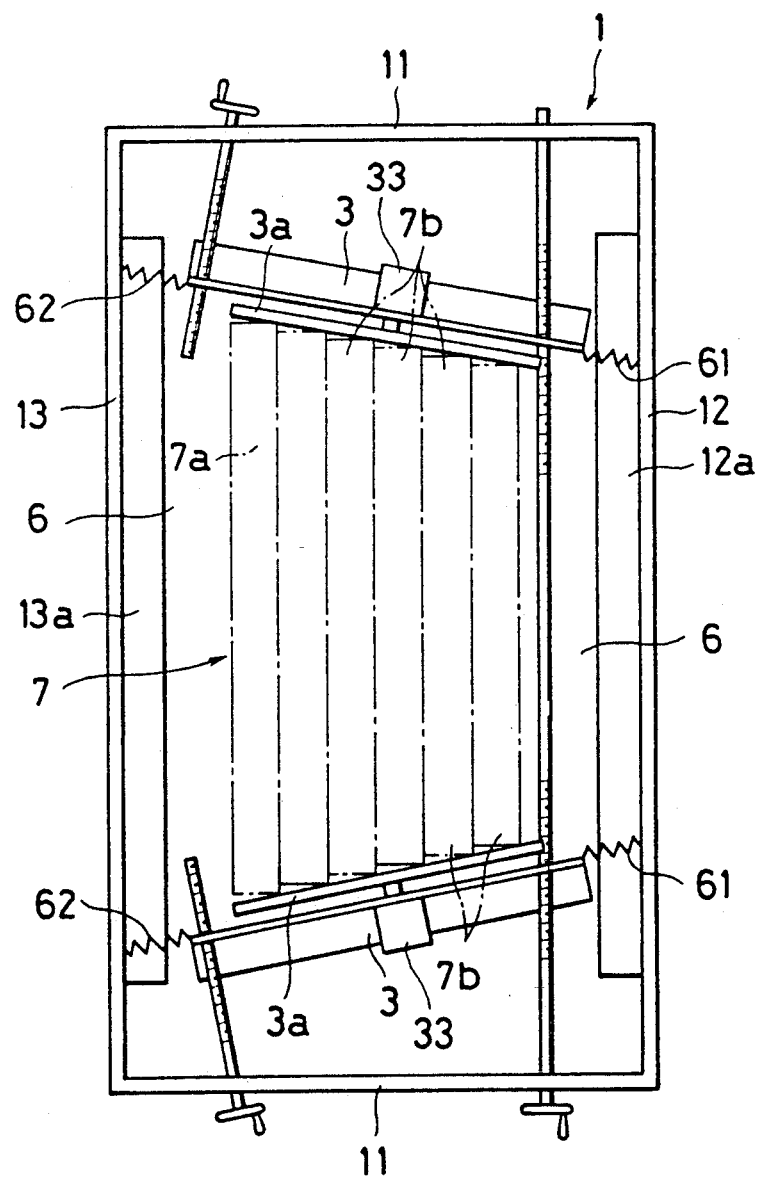
FIG. 3 is a plan view which illustrates the support plates, the hot-air circulating passages and the hot-air guide plates.

As shown in FIGS. 2 and 3, the hot-air circulating passages 6 and 6 are provided at the inlet and outlet sides for the film "F" of the support plates 3 and 3. The hot-air circulating passage 6 at the inlet side of the film "F" comprises a front wall 12 of the housing 1; a sealing member 12a which extends to the side plates 32 and 32 of the support plates 3 and 3 at the lower end; and a pair of heat-resisting cloth bellows 61 and 61 fixed to the side plates 32 and 32 on the sealing member 12a. The bellows 61 is connected to the front wall 12 with magnets 61a at the side end to form a sealed passage which communicates with the fan 51 in the hot-air generating means 5. The hot-air circulating passage 6 at the outlet side "O" for the film "F" comprises a rear wall 13 of the housing 1; a sealing member 13a which extends to the side plates 32 and 32 of the support plates 3 and 3 at the lower end of the rear wall 13; and a pair of heat-resisting cloth bellows 62 and 62 fixed to the side edges of the side plates 32 and 32 on the sealing member 13a. The bellows 62 and 62 are connected to the front wall 12, thereby forming a sealing passage which communicates with the fan 51 in the hot-air generating device 5.

A slight gap is formed between the sealing members 12a and 13a and the film "F", but air-flow to the outside is actually limited to a negligible extent owing to balance between discharge and supply with respect to the fan 51.

Figure 8:
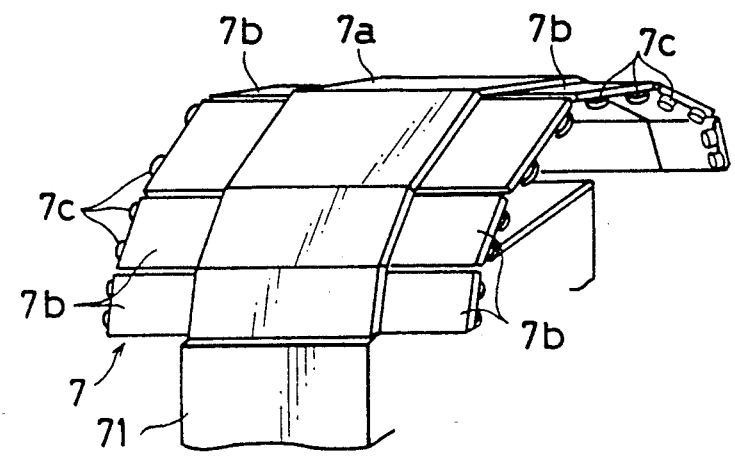
FIG. 8 is a perspective view of the hot-air guide plates in the stretching machine.
Figure 9:
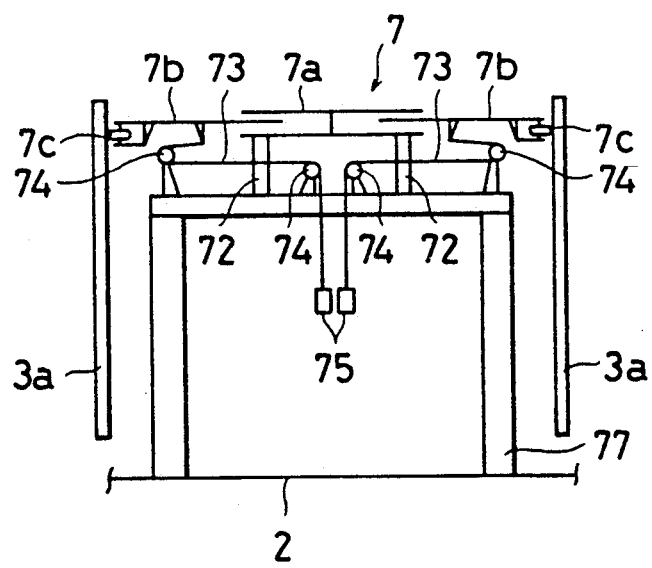
FIG. 9 is a view which illustrates the inner structure of the hot-air guide plates.
Figure 10:
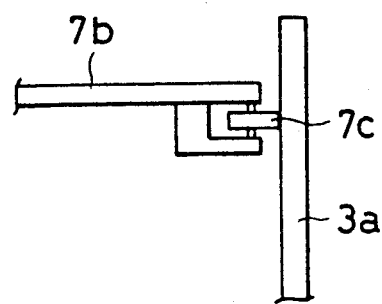
FIG. 10 is a view which illustrates a caster in a moving plate in the hot-air guide plates.

As shown in FIGS. 8 to 10, the hot-air guide plate 7 between the support plates 3 and 3 comprises a fixed plate 7a supported via struts 72 on a support 71 fixed to the base 2, and moving plates 7b and 7b between which the fixed plate 7a are located. The fixed plate 7a comprises a plurality of plates arranged over the upper semicircle of the stretching pulley 31. The moving plates 7b are slidably connected to each plate of the fixed plate 7a, and are joined to one end of the wire 73 in the middle. The moving plates 7b are pushed by thrust means; that is to say, the moving plate 7b is pushed towards the stretching pulley 31 with a weight 75 at the other end of the wire 73 which suspends in the support 71 via pulleys 74 on the support 71, and casters 7c at the side of the moving plate 7b are slidable on the inner wall of the stretching pulley 3a.

Figure 11:
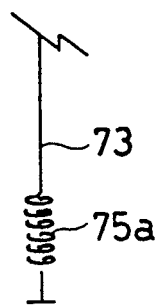
FIG. 11 is a view which illustrates a coil spring connected to a wire in the hot-air guide plate.
Figure 12:
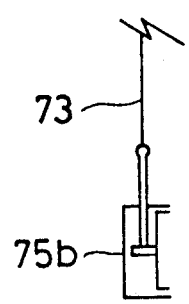
FIG. 12 is a view which illustrates a hydraulic cylinder connected to the wire.
Figure 13:
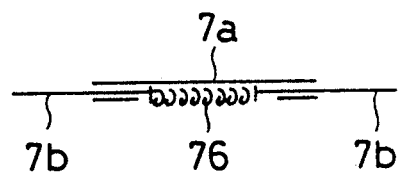
FIG. 13 is a view which illustrates a coil spring provided between the moving plates.
Figure 14:
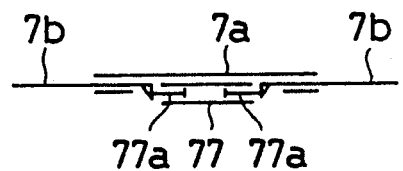
FIG. 14 is a view which illustrates a hydraulic cylinder provided between the moving plates.
Figure 15:
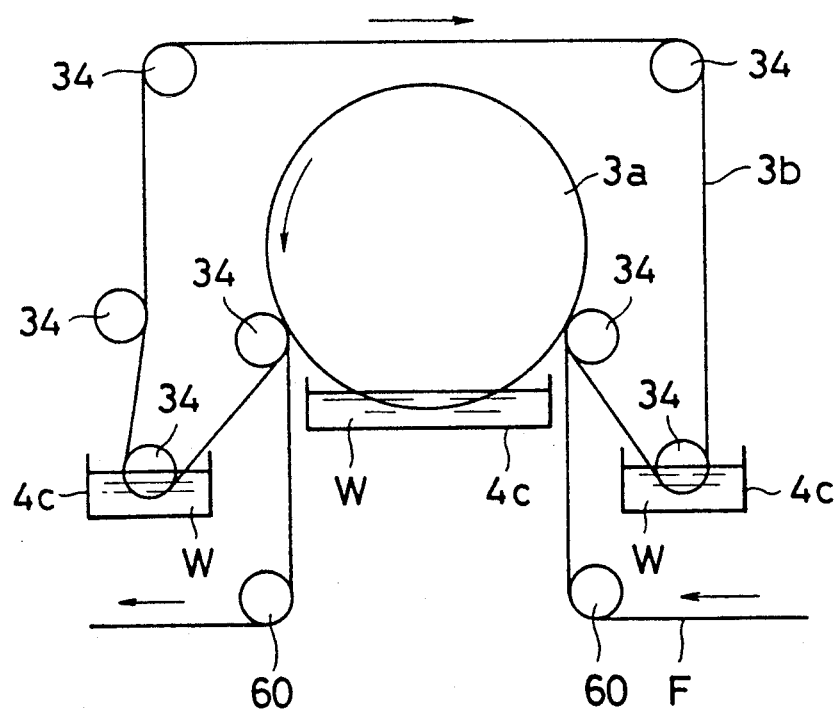
FIG. 15 is a view which illustrates three water baths to cool both pulleys and a belt.

As shown in FIGS. 11 and 12, instead of the weight 75 in the hot-air guide plate 7, a coil spring 75a or a hydraulic cylinder 75b may be connected to the other end of the wire 73 to push the moving plates 7b towards the stretching pulley 3a. A coil spring 76 may be located under the fixed plate 7 as shown in FIG. 13, or a hydraulic cylinder 77 may be located under the fixed plate 7a as shown in FIG. 14 to act against piston rods 77a and 77a, thereby pushing the moving plates 7b and 7b against the stretching pulleys 3a and 3a.

In this embodiment of the stretching machine, when the stretch-width/stretch-ratio adjusting mechanism 4 adjusts the distance or angle between the two support plates 3 and 3 to determine the stretch width or stretch ratio of the film "F" to be stretched, the moving plates 7b and 7b move and engage with the inner walls of the stretching pulleys 3a and 3a depending on the distance and angle between the two support plates 3 and 3, as shown in FIG. 3.

In this embodiment, in the case that the film "F" to be stretched is substantially non-permeable, hot air is blown against the middle of the stretching path of the film by the hot-air generating device 5, and flows over the surface of the film towards the inlet and outlet sides "I" and "O" to heat the film to a uniform temperature. Thereafter, hot air passes through the hot-air circulating passages 6 and 6 and is sucked into the fan 51 in the hot-air generating device.

In the case that the film "F" is permeable such as a slitted film, hot air is blown against the middle of the film by the hot-air generating device and flows over the surface of the film towards the inlet and the outlet sides "I" and "O" for the film to heat the film to a unform temperature. On the other hand, hot air which passes through the film flows along the hot-air guide plate 7 towards the inlet and outlet sides "I" and "O" and is sucked into the fan 51 in the hot-air generating device 5 through the hot-air circulating passages 6 and 6. Thus, hot air sucked into the fan 51 is heated to the original temperature by the heater 52 in the hot-air generating means 5.

Accordingly, hot-air flow separating in the hot-air guide plate 7, sealing in the hot-air circulating passages 6 and 6 and sucking into the fan 51 in the hot-air generating device 5 could prevent hot air from leakage to the outside and could prevent cooling air from being sucked to the inside of the housing.

The stretching machine according to the present invention is embodied as the foregoing structures, but is not limited to the embodiments. Various changes and modifications are possible within the scope of the claims as below. The above embodiment illustrates that the heater 52 is located in front of the fan 51 in the hot-air generating device 5, but, for example, the heater 52 may be located between the flow regulator 53 and the louver 54. Under the louver 54 of the hot-air generating device 5 or within the hot-air circulating passage 6, there may be provided a known temperature sensor, with which the temperature of hot air is detected and is used for adjusting the rate of flow through the fan 51 in the hot-air generating device, or the sensor may turn on and off the heater 52 automatically, thereby controlling the temperature of hot air.

The hot-air generating device 5 may be provided under the stretching pulleys 3a and 3b. The film "F" may be transferred on the lower arcuate portion of the stretching pulleys 3a and 3a.

In the embodiment of the stretching machine, the film "F" held between the stretching pulley 3a and the circulating belt 3b is heated with hot air through the hot-air generating device 5 to a certain temperature. The stretching pulley 3a and the circulating belt 3b indirectly heated with hot air through the hot-air generating device 5 is cooled at a non-held portion of the film "F" with water in the water bath 4c.

Only the stretching pulley 3a is cooled in the foregoing embodiment, but both the stretching pulley 3a and the circulating belt 3a may be cooled as shown in FIG. 5.

Further, hot air may flow upwardly or downwardly through an outside duct, or the film may be heated with a remote-infrared heater. The stretching pulley 3a and the circulating belt 3b may be cooled with cooling air.

In the stretching machine, there may be provided a caster on the horizontal plates 31 and 31 of the support plates 3 and 3 so that the support plates may move on the base 2.

Figure 16:
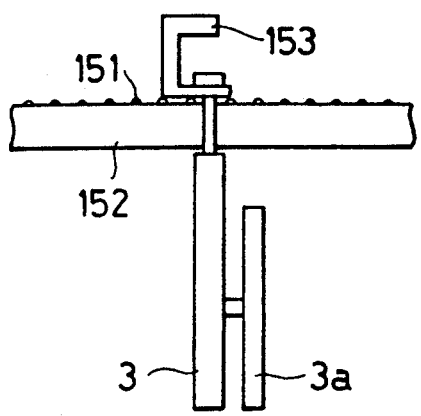
FIG. 16 is a view of another support plate.

As shown in FIG. 16, there may be provided a track rail 152 on which a number of steel balls 151 are embedded and a sliding member 153 which is slidable on the steel balls 151, and the support plates 3 and 3 may be suspended from the sliding member 153.

Figure 17:
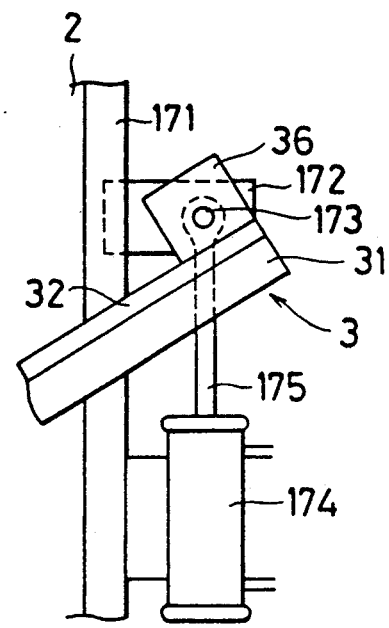
FIGS. 17 to 21 are variants of the stretch-width/stretch-ratio adjusting mechanism.
Figure 18:
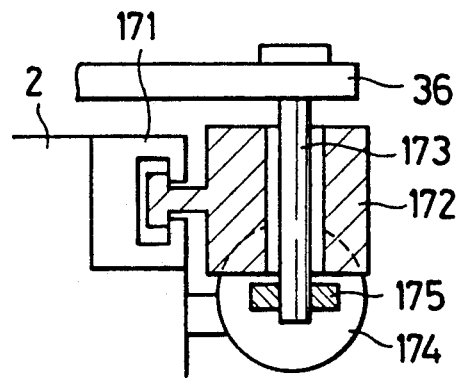
Figure 19:
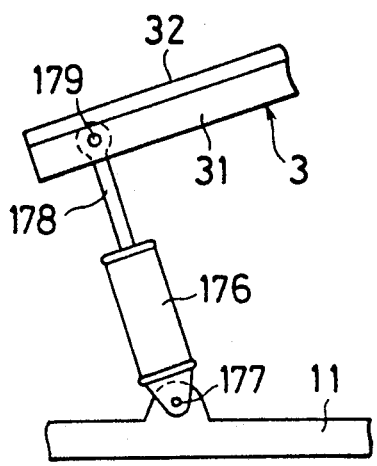
Figure 20:
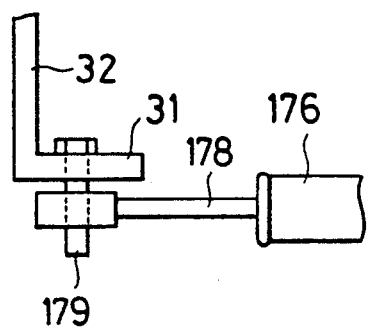

The stretch-width/stretch-ratio adjusting mechanism 4 may be constructed as shown in FIGS. 17 to 20. In FIGS. 17 and 18, the inlet-side distance changing mechanism 4A comprise a base 2 having a guide rail 171 on which a slider 172 is slidably supported in a width direction. A projection 36 of the support plate 3 is rotatably connected to the slider 172 via a pin 173. A cylinder 174 is fixed to the base 2 and a rod 175 of the drive cylinder 174 is connected to the pin 173. In FIGS. 19 and 20, the outlet-side distance changing mechanism 4B comprise a drive cylinder 176 rotatably connected to the side wall 11 of the housing 11 via a pin 177. The rod 178 of the drive cylinder 176 is rotatably connected to the horizontal base plate 31 at the outlet via a pin 179.

Figure 21:
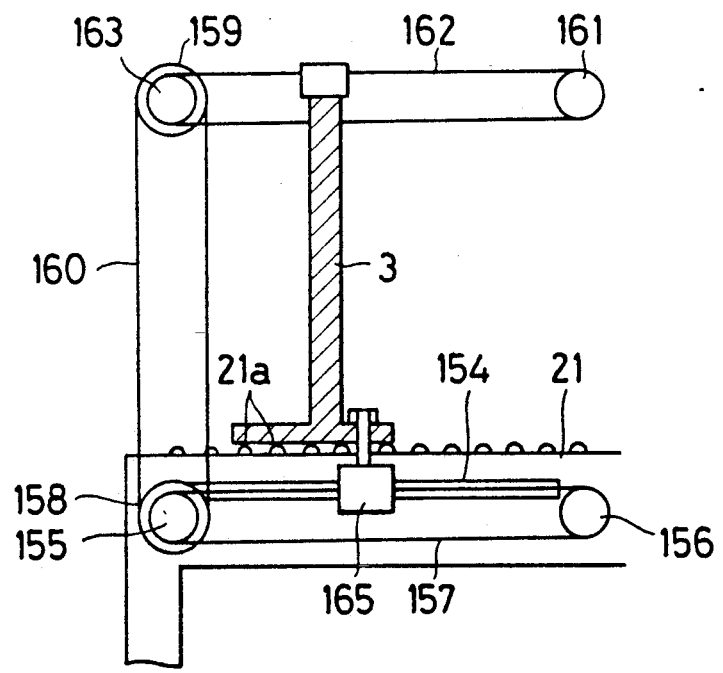

The stretch-width/stretch-ratio adjusting mechanism 4 may be constructed as shown in FIG. 21. Along a track rail 21 in the inlet-side distance changing mechanism 4A, there is provided a guide rail 154 by which a slider 165 fixed to the lower part of the support plate 3 is slidably supported. Drive and follower sprockets 155 and 156 are provided by the ends of the guide rail 154. An endless chain 157 is wound around and between the drive and follower sprockets 155 and 156. A slider 165 is connected to the endless chain 157. A drive sprocket 158 is provided to rotate together with the drive sprocket 155. A follower sprocket 159 is provided above the drive sprocket 158, an endless chain 160 being wound around the sprockets 158 and 159. Above the follower sprocket 156, there is provided a follower sprocket 161, an endless chain 162 being wound around and between the follower sprockets 161 and 163 which rotates together with the follower sprocket 159. The upper end of the support plate 3 is mounted to the endless chain 162. When the drive sprockets 155 and 158 are driven manually or by a motor, the support plate 3 moves in a horizontal direction. The outlet-distance changing mechanism 4B is also constructed in a similar manner.

The foregoing description merely relates to preferable embodiments according to the present invention. The present invention is not limited to the above, and various variations and modifications may be carried out by person skilled in the art without departing from the scope of claims as below.

What is claimed is:

1. A stretching machine for stretching a stretchable sheet-like member comprising:
    a housing having opposite inlet and outlet sides, and a central axis passing through the inlet and outlet sides;
    a pair of frames arranged in the housing such that one of the frames is positioned on one side of the central axis and the other frame on the other side of the central axis;
    a pair of stretching pulleys mounted on respective frame to face each other in a divergent relationship with a first distance between the stretching pulleys at the inlet side and a second distance between the stretching pulleys at the outlet side, the second distance being greater than the first distance;
    a pair of belts wound around a portion of respective stretching pulleys to hold a side edge of a stretchable sheet-like member between the stretching pulley and the belt, whereby the stretchable sheet-like member is stretched laterally relative to the central axis upon a rotation of the stretching pulleys and the belts, the stretchable sheet-like member having an outer surface and an inner surface;

hot air generating means arranged in the housing and including at least one heater and at least one fan to blow hot air to the outer surface of the stretchable sheet-like member such that a part of the hot air flows along the stretchable sheet-like member toward the inlet side and the remaining part of the hot air flows along the stretchable sheet-like member toward the outlet side; and hot air circulating passage means within the housing for returning the hot air blown to the stretchable sheet-like member and distributed toward the inlet and outlet sides to the hot air generating means.

2. A stretching machine as defined in claim 1, further comprising an arcuate hot-air guide means for guiding hot air, said guide means being arranged along and inside a travelling path of the sheet-like member.

3. A stretching machine as defined in claim 1 wherein the hot-air generating means comprise a fan for generating air flow; a heater for heating air flow to hot air; a flow regulator for guiding hot air; and a louver between the flow regulator and the frames for adjusting distribution of hot air which is blown to the sheet-like member.

4. A stretching machine as defined in claim 1 wherein the hot-air circulating passage means comprises bellows mounted between the housing and the frames, the bellows having a lower end; and a sealing member mounted to the lower end of the bellows at inlet and outlet sides of the housing.

5. A stretching machine as defined in claim 4 wherein the bellows is mounted to the housing with a magnet.

6. A stretching machine as defined in claim 3 wherein the louver comprises an upper longitudinal louver and a lower lateral louver having opposite ends, each louver comprising a plurality of flow-direction adjusting plates the angles of which are adjustable thereby regulating distribution of hot air blown to the sheet-like member.

7. A stretching machine as defined in claim 6 wherein a pair of shutter plates are slidably connected at the ends of the lateral louver to prevent hot air from leakage outside the housing.

8. A stretching machine as defined in claim 2 wherein the hot-air guide means is arranged in a divergent configuration between the stretching pulleys.

9. A stretching machine as defined in claim 8 wherein the hot-air guide means comprises a fixed plate supported with a strut; and moving plates between which the fixed plate is located, the moving plates being pushed against the stretching pulleys via a caster by thrust means.

10. A stretching machine as defined in claim 9 wherein the thrust means comprise a weight mounted to a wire, the wire being connected to the moving plates.

11. A stretching machine as defined in claim 9 wherein the thrust means comprise a coil spring mounted to a wire, the wire being connected to the moving plates.

12. A stretching machine as defined in claim 9 wherein the thrust means comprise a hydraulic cylinder mounted to a wire, the wire being connected to the moving plates.

13. A stretching machine as defined in claim 9 wherein the thrust means comprise a coil spring located between the moving plates.

14. A stretching machine as defined in claim 9 wherein the thrust means comprise a hydraulic cylinder located between the moving plates.

15. A stretching machine as defined in claim 2 wherein the stretchable sheet-like member comprises a perforated sheet, and wherein hot air blown to the outer surface of the stretchable sheet-like member flows through the stretchable sheet-like member and is reflected toward the hot air guide means, and further, heats the stretchable sheet-like member at the inner surface thereof.

16. A stretching machine as defined in claim 2 wherein the frames comprise a pair of support plates standing within the housing, and the housing has a ceiling wall, an inlet side wall having an inlet for the stretchable sheet-like member and an outlet side wall having an outlet for the stretchable sheet-like member.

17. A stretching machine as defined in claim 2 wherein the hot air circulating passage means is delimited by the ceiling wall, the inlet side wall, the outlet side wall, the frames and the hot air guide means.

18. A stretching machine as defined in claim 1 further comprising
cooling means for cooling the stretching pulleys and belts.

19. A stretching machine as defined in claim 18 further comprising a plurality of turn pulleys about which the belts are wound.

20. A stretching machine as defined in claim 18 wherein the cooling means comprise a water bath for cooling a portion of the stretching pulleys which do not hold the sheet-like member.

21. A stretching machine as defined in claim 19 wherein the cooling means comprise a water bath for cooling the turn pulleys around which the belts are wound.

22. A stretching machine as defined in claim 1 further comprising
inlet-side distance changing means for moving at least one of the pulleys adjacent the inlet side of the housing in the direction of width of the sheet-like member, thereby changing the distance between said pair of pulleys at the inlet side; and
outlet-side distance changing means for moving at least one of the pulleys adjacent the outlet side of the housing in the direction of width of the sheet-like member, thereby changing the distance between said pair of pulleys at the outlet side.

23. A stretching machine as defined in claim 22 wherein a base is provided within the housing, and the frames comprise a pair of support plates each of which comprises a vertical side plate with upper and lower ends and a horizontal base plate at the lower end of the vertical side plate within the housing.

24. A stretching machine as defined in claim 23 further comprising a fixed rail having a longitudinal groove and a track rail having steel balls, the base plate riding on the steel balls, thereby connecting the support plates to the fixed rail by engaging a screw within an elongated opening of the support plates and the groove of the fixed plate.

25. A stretching machine as defined in claim 23 wherein the inlet-side distance changing means comprise at the inlet side a pair of holders, each holder being rotatably connected around a shaft to a projection which projects from the horizontal base plate of the respective support plate; a first screw shaft which is supported via a bearing and has a reverse thread connected to each holder; and a second screw shaft connected to the first screw shaft via a chain and having ends which are supported at upper side walls of the housing, a middle reverse thread of the second screw shaft being connected to the side plates of the support plates; and the outlet-side distance changing means comprise at the outlet side a pair of third screw shafts each supported at one end to the base via a spherical bearing and connected at an opposite end to a portion of the support plate; and a pair of fourth screw shafts connected to the third screw shafts via a chain, one end being supported at an upper side wall of the housing, and an opposite end being connected to the side plate of the support plate.

26. A stretching machine as defined in claim 23 wherein there are provided a track rail positioned on the base and on which a number of steel balls are embedded; and a single sliding member which is slidable on the steel balls and is suspended from the support plates.

27. A stretching machine as defined in claim 23 wherein the inlet side distance changing means comprise a guide rail on the base; a slider movably supported through a groove in the guide rail; a projection which projects from the respective support plate and is rotatably connected to the slider via a pin; and a drive cylinder fixed to the base, a rod of the drive cylinder being connected to the pin.

28. A stretching machine as defined in claim 23 wherein the outlet-side distance changing means comprise a drive cylinder rotatably connected to a side wall of the housing via a pin, a rod of the drive cylinder being connected to the horizontal base plate of one of the support plates via a pin adjacent the outlet side.

29. A stretching machine as defined in claim 23 wherein the inlet-side and outlet-side distance changing means comprise a guide rail along the track rail, the guide rail having opposite ends; a slider movably connected to the guide rail and fixed to one of the support plates; a first drive sprocket and a first follower sprocket located at opposite ends of the guide rail, a first endless chain being wound around the first drive sprocket and first follower sprocket, the slider being connected to the first endless chain; a second drive sprocket rotatable with the first drive sprocket; a second follower sprocket above the second drive sprocket; a second endless chain wound around the second drive sprocket and second follower sprocket; a third follower sprocket rotatable with the second follower sprocket; and a fourth follower sprocket, a third endless chain wound with the third and fourth follower sprockets, the third endless chain being connected to the one support plate.

30. A stretching machine as defined in claim 1 further comprising
a pair of drive means for moving the pulleys independently of one another.

31. A stretching machine as defined in claim 30 wherein each drive means comprises a motor.

32. A stretching machine as defined in claim 1 wherein the hot air generating means blows hot air to the stretchable sheet-like member at an intermediate position of the inlet end and the outlet end of the stretching pulleys.

33. A stretching machine as defined in claim 1 further comprising means for changing the distance between the stretching pulleys.

* * * * *